(12) United States Patent
Metke et al.

(10) Patent No.: US 9,609,541 B2
(45) Date of Patent: *Mar. 28, 2017

(54) METHOD AND APPARATUS FOR DEVICE COLLABORATION VIA A HYBRID NETWORK

(71) Applicant: MOTOROLA SOLUTIONS, INC, Schaumburg, IL (US)

(72) Inventors: Anthony R. Metke, Naperville, IL (US); Thomas J. Senese, Schaumburg, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 107 days.

This patent is subject to a terminal disclaimer.

(21) Appl. No.: 14/587,409

(22) Filed: Dec. 31, 2014

(65) Prior Publication Data

US 2016/0192230 A1    Jun. 30, 2016

(51) Int. Cl.
*H04W 4/00*        (2009.01)
*H04W 28/02*    (2009.01)
(Continued)

(52) U.S. Cl.
CPC ........... *H04W 28/021* (2013.01); *H04L 12/28* (2013.01); *H04L 12/462* (2013.01);
(Continued)

(58) Field of Classification Search
USPC ................. 370/338; 455/410–411, 522.1
See application file for complete search history.

(56) References Cited

U.S. PATENT DOCUMENTS

| | | |
|---|---|---|
| 6,076,168 A | 6/2000 | Fiveash et al. |
| 6,092,191 A | 7/2000 | Shimbo et al. |

(Continued)

FOREIGN PATENT DOCUMENTS

| | | |
|---|---|---|
| EP | 1503549 B1 | 5/2008 |
| EP | 2434834 A2 | 3/2012 |

(Continued)

OTHER PUBLICATIONS

"PKCS# 11 v2.20: Cryptographic Token Interface Standard," RSA Laboratories, Jun. 28, 2004, Copyright© 1994-2004 RSA Security Inc., pp. 1-391.

(Continued)

*Primary Examiner* — Phuongchau Ba Nguyen

(57) ABSTRACT

An access point is provided that bridges a PAN with a LAN. When the access point receives, from a first mobile device, a request to authenticate with the access point for a first network service and a request to establish a second network service, wherein the second network service provides for bridging a PAN with a LAN, the access point determines a credential to be used by mobile devices who wish to join the second network service and, in response to determining that the first mobile device is authorized to make such a request, establishes the second network service. Further, in response to receiving, from a second mobile device, a request to join the second network service, which request includes the credential, the access point joins the second mobile device to the second network service and bridges traffic between the first and second mobile devices using the second network service.

5 Claims, 9 Drawing Sheets

(51) Int. Cl.
- *H04W 12/06* (2009.01)
- *H04L 12/26* (2006.01)
- *H04W 88/08* (2009.01)
- *H04L 12/28* (2006.01)
- *H04L 12/46* (2006.01)
- *H04W 84/20* (2009.01)
- *H04W 88/04* (2009.01)
- *H04W 84/04* (2009.01)
- *H04W 48/10* (2009.01)

(52) U.S. Cl.
CPC .......... *H04L 12/4625* (2013.01); *H04L 43/12* (2013.01); *H04W 4/008* (2013.01); *H04W 12/06* (2013.01); *H04W 88/08* (2013.01); *H04W 48/10* (2013.01); *H04W 84/047* (2013.01); *H04W 84/20* (2013.01); *H04W 88/04* (2013.01)

(56) References Cited

U.S. PATENT DOCUMENTS

| | | |
|---|---|---|
| 6,792,466 B1 | 9/2004 | Saulpaugh et al. |
| 6,865,371 B2 | 3/2005 | Salonidis et al. |
| 7,095,748 B2 | 8/2006 | Vij et al. |
| 7,802,111 B1 | 9/2010 | Tahan |
| 7,894,447 B2 | 2/2011 | Khan |
| 8,391,918 B2 | 3/2013 | Ekici et al. |
| 8,984,592 B1 | 3/2015 | Paczkowski et al. |
| 9,027,102 B2 | 5/2015 | Katzer et al. |
| 9,054,961 B1* | 6/2015 | Kim .................. H04L 41/0806 |
| 9,055,062 B1* | 6/2015 | Huang ................ H04L 63/0884 |
| 9,420,465 B2* | 8/2016 | Metke .................. H04W 12/06 |
| 2002/0143855 A1 | 10/2002 | Traversat et al. |
| 2002/0143944 A1 | 10/2002 | Traversat et al. |
| 2002/0196771 A1 | 12/2002 | Vij et al. |
| 2003/0069989 A1 | 4/2003 | Silvester |
| 2003/0099212 A1 | 5/2003 | Anjum et al. |
| 2004/0030794 A1 | 2/2004 | Hugly et al. |
| 2004/0081154 A1 | 4/2004 | Kouvelas |
| 2004/0098447 A1 | 5/2004 | Verbeke et al. |
| 2004/0250126 A1 | 12/2004 | Buer et al. |
| 2005/0027871 A1 | 2/2005 | Bradley et al. |
| 2005/0091494 A1 | 4/2005 | Hyser |
| 2005/0113102 A1 | 5/2005 | Kwon et al. |
| 2005/0122944 A1 | 6/2005 | Kwon et al. |
| 2005/0126964 A1 | 6/2005 | Brieden et al. |
| 2005/0223109 A1 | 10/2005 | Mamou et al. |
| 2006/0041937 A1 | 2/2006 | Chandley et al. |
| 2007/0010261 A1 | 1/2007 | Dravida |
| 2007/0281685 A1 | 12/2007 | Pan et al. |
| 2007/0283153 A1 | 12/2007 | Metke et al. |
| 2007/0300069 A1 | 12/2007 | Rozas |
| 2008/0066181 A1 | 3/2008 | Haveson |
| 2008/0072070 A1 | 3/2008 | LaMacchia et al. |
| 2009/0064346 A1 | 3/2009 | Larsson et al. |
| 2009/0292919 A1 | 11/2009 | England |
| 2012/0079368 A1 | 3/2012 | Abdelaziz et al. |
| 2012/0124658 A1 | 5/2012 | Brudnicki et al. |
| 2012/0238206 A1 | 9/2012 | Singh et al. |
| 2012/0317628 A1 | 12/2012 | Yeager |
| 2013/0067243 A1 | 3/2013 | Tamayo-Rios et al. |
| 2013/0086669 A1 | 4/2013 | Sondhi et al. |
| 2013/0145429 A1 | 6/2013 | Mendel et al. |
| 2013/0219164 A1 | 8/2013 | Hamid |
| 2014/0074637 A1 | 3/2014 | Hammad |
| 2014/0208434 A1 | 7/2014 | Brouwer et al. |
| 2014/0227972 A1 | 8/2014 | Swaminathan et al. |
| 2014/0230007 A1 | 8/2014 | Roth et al. |
| 2014/0282936 A1 | 9/2014 | Fitzgerald et al. |
| 2014/0297799 A1 | 10/2014 | Gordon |
| 2014/0298411 A1 | 10/2014 | Castell et al. |
| 2014/0317686 A1 | 10/2014 | Vetillard |
| 2015/0033290 A1 | 1/2015 | Benyo et al. |
| 2015/0071443 A1* | 3/2015 | Cherian ................ H04W 12/06 380/270 |
| 2016/0036854 A1 | 2/2016 | Himawan et al. |

FOREIGN PATENT DOCUMENTS

| | | |
|---|---|---|
| WO | WO02/08857 A2 | 1/2002 |
| WO | 2009/153710 A2 | 12/2009 |

OTHER PUBLICATIONS

Jehangir, A. and Heemstra De Groot, S.M., "Securing Personal Network Clusters," IEEE Third International Conference on Security and Privacy in Communications Networks and the Workshops, 2007 Securecomm 2007, Piscataway, NJ, USA, Sep. 17, 2007, pp. 320-329.

Lorch, M. et al., "A hardware-secured credential repository for Grid PKIs," 4th IEEE International Symposium on Cluster Computing and the Grid, Apr. 19-22, 2004, pp. 640-647.

Urien, P., "Cloud of Secure Elements perspectives for mobile and cloud applications security," IEEE Conference on communications and Network Security (CNS), 2013—Poster Session, pp. 371-372.

Non-Final Office Action mailed Sep. 21, 2015, in U.S. Appl. No. 14/447,257, Himawan E. et al., filed Jul. 30, 2014.

International Search Report and Written Opinion for corresponding International Patent Application No. PCT/US2015/041747, mailed on Oct. 23, 2015.

Notice of Allowance mailed Jan. 21, 2016, in U.S. Appl. No. 14/447,257, Himawan E. et al., filed Jul. 30, 2014.

International Search Report and Written Opinion for, SN: PCT/US2015/065591, filed: Dec. 9, 2015, mailed Mar. 29, 2016, all pages.

Non-Final Office Action mailed Mar. 30, 2016, in U.S. Appl. No. 14/587,389, Metke et al., filed Dec. 31, 2014.

* cited by examiner

METHOD AND APPARATUS FOR DEVICE COLLABORATION VIA A HYBRID NETWORK

CROSS-REFERENCE TO RELATED APPLICATIONS

This application is related to U.S. patent application Ser. No. 14/587,389, filed on the same date as this application, which application is assigned to Motorola Solutions, Inc., and which application is hereby incorporated herein in its entirety.

FIELD OF THE INVENTION

The present invention relates generally to wireless communication systems, and, in particular, to device collaboration via a hybrid wireless network.

BACKGROUND OF THE INVENTION

Device collaboration is a set of features that allows multiple devices under control of a single user to take advantage of capabilities of the other collaborating devices via a link between them, that is, a collaborative interface. For example, one collaborating device may hop through another device with better connectivity to reach a network service, or one device may access context or other information (such as address book information) on a peer collaborating device. A more specific example would include a Land Mobile Radio (LMR) device and a broadband device. Under non-collaborative operation, the LMR device is not able to access data services that are only available on broadband networks. Through collaboration, the LMR device is able to access broadband data services via the broadband device. More advanced collaborative features would allow user single sign-on (SSO) status to be shared among collaborating devices, or would allow a user to start an application on one device, and pause it and continue on another device.

Collaborative devices have a special relationship with each other in that they can be considered to be working together on behalf of a user. It would not be unreasonable to consider collaborating devices to be a single multiprocessor "virtual device," with each processor connected by a wireless bus (that is, the collaborative interface). From a security point of view, this "virtual device" model is a good analogy because new and advanced collaborative features will demand the same type of security between devices that is expected over a single internal platform bus.

Personal Area Networks (PANs), such as Bluetooth (BT), are well suited for device collaboration communications. Because PAN technologies, such as BT, require a user to physically pair the devices (for example, via a Personal Identification Number (PIN) entry or a Near Field Communication (NFC) pairing), it is simple for a user to provide the necessary security needed for such a collaborative interface through the user's personal physical security. Further, BT allows for sophisticated inter-device security (with strong key derivation and device authentication) initiated only by the user touching the devices together (for example, when NFC is used).

However, instances arise when a user has a number of devices that are collaborating and sufficiently separates the devices such that they no longer can collaborate over the PAN. For example, a public safety officer may exit his car and leave one of his collaborating devices behind, traveling out of PAN range of the device in the car. For a variety of reasons, the user may still want to take advantage of the collaborative features of the device left behind.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
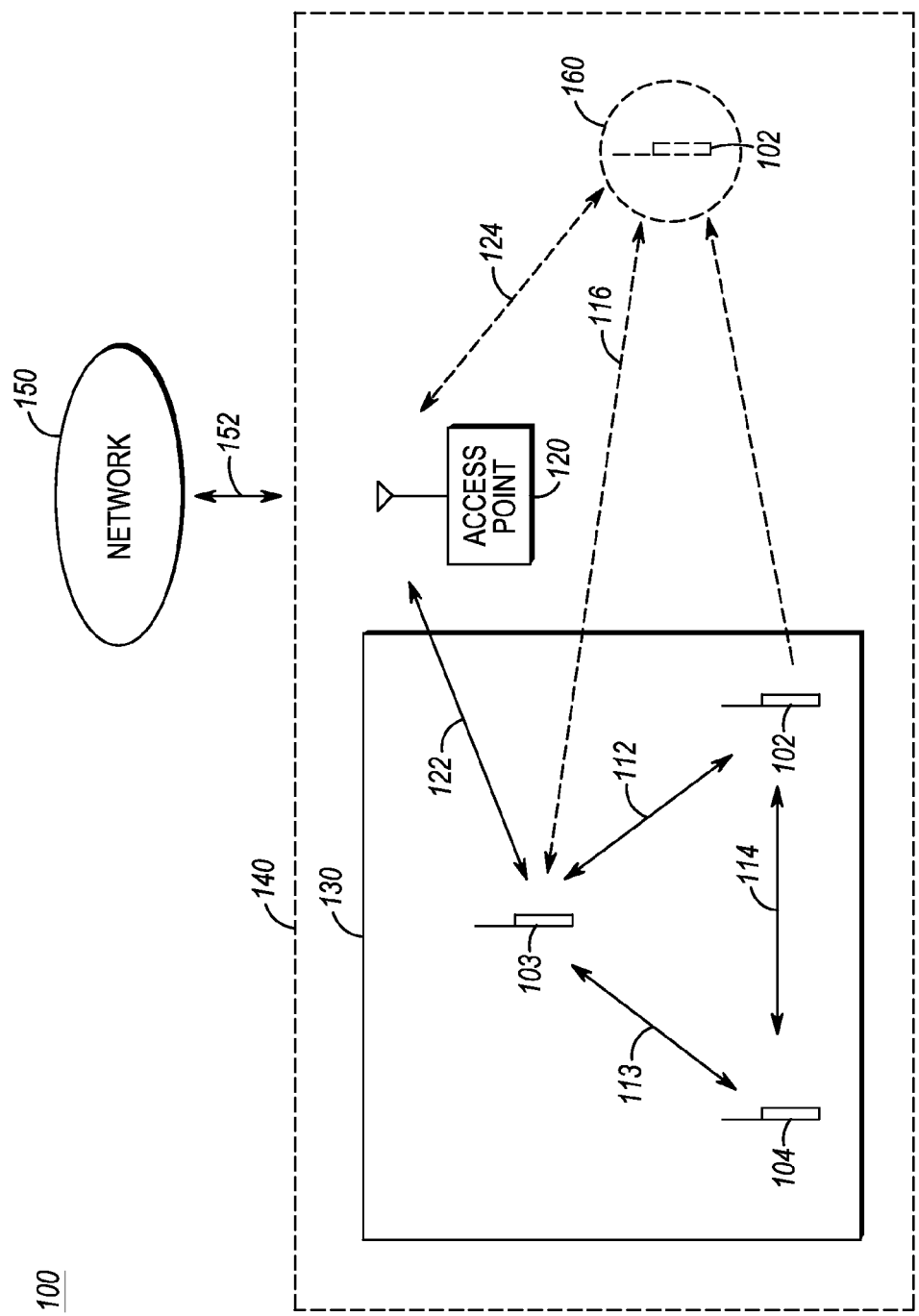
FIG. 1 is a block diagram of a wireless communication system in accordance with some embodiments of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION OF THE INVENTION

To address the need for utilizing collaborative features of a first mobile device left behind when a user carries a second collaborating mobile device out of range of the first mobile device, a communication system is provided wherein a user has multiple devices that are collaborating with each other via a Personal Area Network (PAN). When the user exits his car and leaves one of his collaborating devices in the car, and travels out of PAN range of the device in the car, the communication system provides for the user to take advantage of the collaborative features the device left behind in the car, an access point is provided that bridges a PAN with a local area network (LAN). When the access point receives, from a first mobile device, a request to authenticate with the access point for a first network service and a request to establish a second network service, wherein the second network service provides for bridging the PAN with the LAN, the access point determines a credential to be used by mobile devices who wish to join the second network service and, in response to determining that the first mobile device is authorized to make such a request, establishes the second network service. Further, in response to receiving, from a second mobile device, a request to join the second network service, wherein the request to join the second network service comprises the credential, the access point joins the second mobile device to the second network service and bridges traffic between the first mobile device and the second mobile device using the second network service.

Generally, an embodiment of the present invention encompasses a method for bridging a Personal Area Network (PAN) with a local area network (LAN) at an access point (AP). The method includes receiving, from a first mobile device, a request to authenticate with an access point for a first network service and a request to establish a second network service, wherein the second network service provides for bridging a PAN with a LAN, determining that the first mobile device is authorized to make such a request and establish such a network, determining a credential to be used by mobile devices who wish to join the second network service, and establishing the second network service. The method further includes receiving, from a second mobile device, a request to join the second network service and an associated credential, joining the second mobile device to the second network service, and in response to joining the second mobile device to the second network service, bridging traffic between the first mobile device and the second mobile device using the second network service.

Another embodiment of the present invention encompasses a method for bridging a PAN with a LAN. The method includes detecting, by a first mobile device, a disconnection of a PAN connection to a second mobile device, determining, by the first mobile device, a credential to be used by mobile devices who wish to join a network service, wherein the network service comprises bridging the PAN with the LAN, requesting, by the first mobile device, an establishment of the network service at an access point (AP) using the credential, joining, by the first mobile device, the network service at the AP, and conveying traffic by the first mobile device to the second mobile device via the AP.

Yet another embodiment of the present invention encompasses a system for bridging a PAN with a LAN. The system includes an access point having a processor and an at least one memory device. The at least one memory device is configured to store a set of instructions that, when executed by the processor, cause the processor to receive, from a first mobile device, a request to authenticate with an access point for a first network service and a request to establish a second network service, wherein the second network service provides for bridging a PAN with a LAN, determine that the first mobile device is authorized to make such a request and establish such a network, determine a credential to be used by mobile devices who wish to join the second network service, and establish the second network service. The instructions further, when executed by the processor, cause the processor to receive, from a second mobile device, a request to join the second network service and an associated credential, join the second mobile device to the second network service, and in response to joining the second mobile device to the second network service, bridge traffic between the first mobile device and the second mobile device using the second network service.

Still another embodiment of the present invention encompasses a system for bridging a PAN with a LAN. The system includes a first mobile device having a processor and an at least one memory device. The at least one memory device is configured to store a set of instructions that, when executed by the processor, cause the processor to detect a disconnection of a PAN connection to a second mobile device, determine a credential to be used by mobile devices who wish to join a network service, wherein the network service comprises bridging the PAN with the LAN, request an establishment of the network service at an access point (AP) using the credential, join the network service at the AP, and convey traffic by the first mobile device to the second mobile device via the AP.

The present invention may be more fully described with reference to FIGS. 1-8B. FIG. 1 is a block diagram of a wireless communication system 100 in accordance with some embodiments of the present invention. Communication system 100 includes multiple mobile devices 102-104 (three shown), such as a broadband capable smart phone, a laptop computer, a land mobile radio (LMR), or a tablet, personal data assistant (PDA), or laptop computer with wireless capabilities. Each of the multiple mobile devices 102-104 is configured to operate on a narrowband network or a broadband network and to communicate with infrastructure devices in the corresponding network using any suitable over-the-air protocol and modulation scheme.

In one embodiment, each of the multiple mobile devices 102-104 communicate directly with each other, that is, engage in a peer-to-peer wireless communication with each other, over a Personal Area Network (PAN) 130. In another embodiment, some of the multiple mobile devices may have to communicate with each other over PAN 130 via one or more of the other mobile devices. For example, as depicted in FIG. 1, mobile device 102 communicates with mobile device 103 via a wireless link 112, mobile device 102 communicates with mobile device 104 via a wireless link 114, and mobile device 103 communicates with mobile device 104 via a wireless link 113, wherein each of wireless links 112-114 is a short range wireless link, such as Bluetooth®. Mobile devices 102-104, which communicate with each other and are under the control of a single user, may be referred to herein as collaborating devices, and the wireless links over which the collaborating devices communicate may be referred to herein as collaborative links.

Communication system 100 further includes an access point (AP) 120 that services each mobile device, such as mobile devices 102-104, residing in a coverage area of the AP via a first network service, that is, a local area network (LAN) 140, served by the AP over a bi-directional local area network link 122, such as Wi-Fi. Further, AP 120 communicates with infrastructure devices of a wide area narrowband or broadband network (WAN) 150 serving the AP via a corresponding narrowband or broadband WAN link 152.

A first mobile device of the multiple collaborative mobile devices 102-104, such as mobile device 103, may be designated as a relay device (referred to herein as a PAN relay device'), and the other mobile devices, that is, a second mobile device 102 and a third mobile device 104, then non-relay PAN devices (referred to herein as 'non-relay PAN devices') in that they may use the PAN relay device for intra-PAN communications and communications external to the PAN as described herein. At various times, any of mobile devices 102-104 may serve as a PAN relay device or a non-relay PAN device. The PAN relay device is a mobile device that serves as a relay node for the collaborative devices 102-104, that is, for PAN 130, when one of the collaborating mobile devices 102-104 roams outside of the PAN. For example, when a mobile device 102 roams outside of PAN 130, the mobile device may communicate with other collaborating mobile devices 103, 104 via the PAN relay device. In various embodiments of the present invention and at various times of operation, non-relay PAN devices may communicate directly with each other or may communicate with each other via a PAN relay device.

Figure 2:
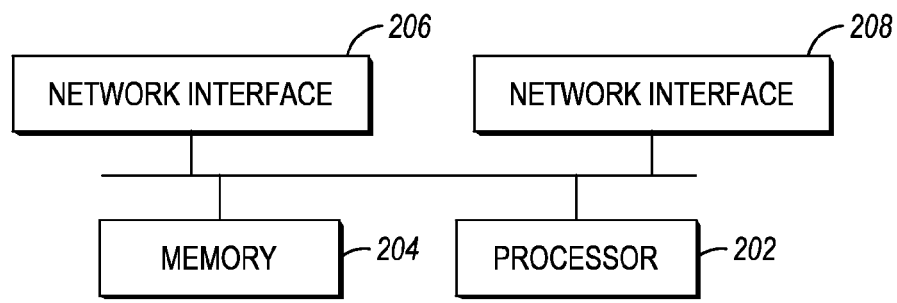
FIG. 2 is a block diagram of a mobile station of the communication system of FIG. 1 in accordance with some embodiments of the present invention.
Figure 3:
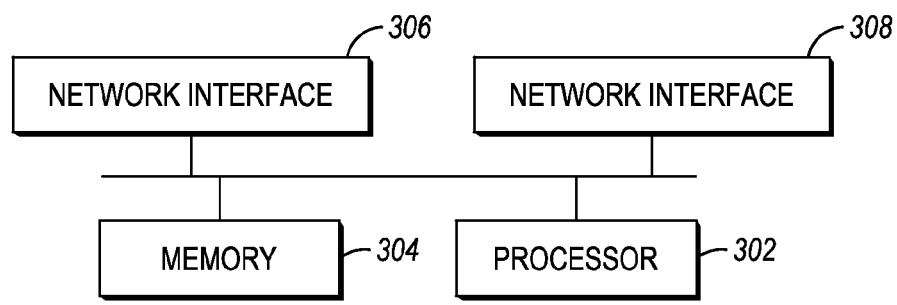
FIG. 3 is a block diagram of an access point of the communication system of FIG. 1 in accordance with some embodiments of the present invention.

Referring now to FIGS. 2 and 3, block diagrams are provided of a mobile device 200, such as mobile devices 102-104, and an AP 300, such as APs 120, 502 (depicted in FIG. 5), and 702, 730, and 732 (depicted in FIG. 7), in accordance with an embodiment of the present invention. Each of mobile device 200 and AP 300 operates under the control of a respective processor 202, 302 such as one or more microprocessors, microcontrollers, digital signal processors (DSPs), combinations thereof or such other devices known to those having ordinary skill in the art. Each processor 202, 302 operates the corresponding mobile device or AP according to data and instructions stored in a respective at least one memory device 204, 304 such as random access memory (RAM), dynamic random access memory (DRAM), and/or read only memory (ROM) or equivalents thereof, that stores data and programs that may be executed by the corresponding processor so that the mobile device or AP may perform the functions described herein.

The at least one memory device 304 of AP 300 further includes a first network service identifier, or LAN identifier, such as a Service Set Identifier (SSID) or any other network service identifier known in the art, and programs that support a second network service, that is, an enhanced collaborative network (ECN) functionality, wherein the first network service may be a conventional LAN associated with a first SSID and the second network service may be LAN associated with, a second SSID, also referred to as an ECN identifier.

In at least one embodiment the AP is a device that can be used to access a network other than WLAN, e.g LTE, WiMAX, etc. In which case the ECN identifier is not stored as an SSID, but as a different type of network identifier appropriate for the type of access point.

The at least one memory device 204 of mobile device 200 further includes one or more mobile device identifiers, including a Media Access Control (MAC) address and any other identifier(s), such as an internet protocol address, a subscriber unit identifier (SUID), an International Mobile Subscriber Identifier (IMSI), International Mobile Station Equipment Identity (IMEI), Mobile Subscriber Integrated Services Digital Network-Number (MSISDN), or a user defined device name, that may be used to identify the mobile device in a network in which it is operating, and an enhanced collaborative network (ECN) identifier. The ECN identifier may be used by the mobile device to set up a local area network (LAN) that is restricted to collaborating devices as described in greater detail below. Further, the at least one memory device 204 of mobile device 200 may include a predetermined key, such as a pre-shared key (PSK), that is shared among all devices that can collaborate with this mobile device.

Mobile device 200 further includes multiple network interfaces 206, 208 (two shown) in communication with processor 202, for example, a first network interface 206 for directly communicating with other mobile devices via a short range wireless protocol, and a second network interface 208 for communicating with AP 300, for example, via a wireless local area network (WLAN) protocol. In turn, each of the multiple network interfaces 206, 208 may include a radio frequency (RF) receiver (not shown) and an RF transmitter (not shown), or they may share one or both of the RF receiver and transmitter. Similarly, AP 300 includes one or more network interfaces 306, 308 (two shown) in communication with processor 302, such as a first network interface 306 for communicating with mobile devices 102-104 and a second network interface 306 for communicating with other APs and/or infrastructure devices of the network serving the AP. Each of the multiple network interfaces 306, 308, if a wireless interface, may include an RF receiver (not shown) and an RF transmitter (not shown), or they may share one or both of the RF receiver and transmitter.

Unless otherwise specified herein, the functionality described herein as being performed by a mobile device, such as mobile devices 102-104, and an AP, such as APs 120 502, 702, 730, and 732, is implemented with or in software programs and instructions stored in the respective at least one memory device 204, 304 of the mobile device and AP and executed by the associated processor 202, 302 of the mobile device and AP.

Figure 4:
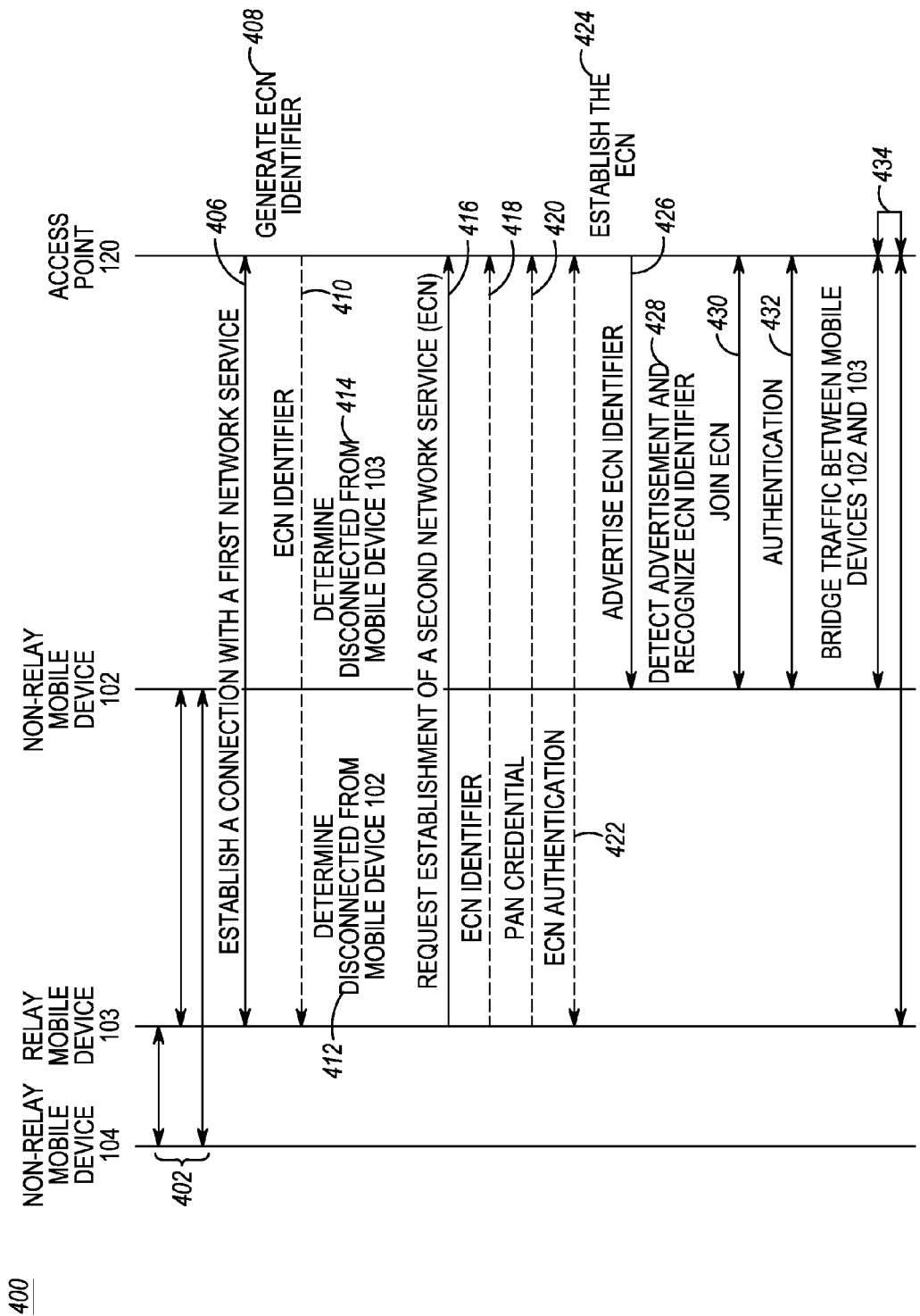
FIG. 4 is a signal flow diagram illustrating a method by which the communication system of FIG. 1 establishes a virtual PAN in accordance with some embodiments of the present invention.

Referring now to FIG. 4, a signal flow diagram 400 is provided that illustrates a method executed by communication system 100 to establish a virtual PAN in accordance with some embodiments of the present invention. Signal flow diagram 400 begins when mobile devices 102, 103, and 104 are initially paired up (402) in PAN 130 via their first, short range, network interfaces 206 and short range wireless links 112-114. Thus, mobile devices 102, 103, and 104 may be considered to be collaborating devices and wireless links 112-114 are collaborative links. The collaborating devices 102-104 include a PAN relay device, for example, mobile device 103, and one or more non-relay PAN devices, such as mobile devices 102 and 104.

Further, PAN relay device 103 establishes (406), via second network interface 208 of the PAN relay device, a connection to AP 120 in association with the first network service, that is, with LAN 140, and via air interface 122. For example, PAN relay device 103 may authenticate with LAN 140, and in particular AP 120, via a certificate based-authentication protocol as known in the art. Normally, AP 120 will only be offering, that is, broadcasting, an identifier of LAN 140, that is, a Service Set Identifier (SSID) associated with the LAN. In response to receiving the SSID, PAN relay device 103 uses this SSID to connect to, that is, associate with, AP 120. PAN relay device 103 may establish this connection with AP 120 either before or after determining that a non-relay PAN device, such as mobile device 102, has disconnected from the PAN relay device, as described below.

Subsequent to pairing up with non-relay PAN devices 102 and 104, PAN relay device 103 realizes (412) that a non-relay PAN device, that is, mobile device 102, no longer is connected to the PAN relay device. At around the same time, non-relay PAN device 102 also realizes (414) that the non-relay PAN device no longer is connected to PAN relay device 103. For example, the disconnection can be a result of a normal event, such as non-relay PAN device 102 powering down. However, the disconnection instead can be a result of non-relay PAN device 102 roaming out of range of PAN 130 (for example, roaming to position 160 in FIG. 1). Communication system 100 then provides for bridging the PAN together even though non-relay PAN device 102 has roamed outside of the PAN.

In response to determining that non-relay PAN device 102 no longer is connected to PAN relay device 103, PAN relay device 103 requests (416) that AP 120 establish a second network service, referred to herein as an extended collaborative network (ECN), which ECN is identified by an ECN identifier. The ECN operates similar to LAN 140 except that the ECN is accessible only by mobile devices, such as mobile devices 102 and 104, that collaborate with mobile device 103.

In one embodiment of the present invention, PAN relay device 103 may convey (418) the ECN identifier to AP 120 in response to establishing the connection with the AP for the first network service. In another embodiment of the present invention, PAN relay device 103 may convey (418) the ECN identifier to AP in response to requesting the establishment of the second network service, that is, the ECN. For example, when mobile devices 102, 103, and 104 initially are paired up in PAN 130, PAN relay device 103 may generate an ECN identifier and distribute it to collaborative devices 102 and 104, which collaborative devices then store the ECN identifier in their respective at least one memory device 204. When PAN relay device 103 then requests that AP 120 establish the ECN, the PAN relay device 103 may convey the ECN identifier to the AP, and the AP then stores the ECN identifier in its at least one memory device 304.

In still other embodiments of the present invention, AP 120 may generate (408) the ECN and provide (410) the ECN identifier to PAN relay device 103. That is, when the PAN relay device 103 connects to AP 120, the AP may generate the ECN identifier and store the ECN identifier in the AP's at least one memory device 304. AP 102 then may convey the ECN identifier to PAN relay device 103, and the PAN relay device may distribute the ECN identifier to collaborative devices 102 and 104. Each of collaborative devices 102-104 then stores the ECN identifier in their respective at least one memory device 204.

Optionally, PAN relay device 103 further may convey (420) to AP 120, after establishing a connection to the AP for the first network service, that is, LAN 140, a PAN credential, for example, a predetermined key such as a pre-shared key (PSK), an authentication certificate, or an attribute from an authentication certificate, maintained by the mobile device and that is shared among all of the collaborating mobile devices, that is, mobile devices 102-104, and that must appear in any credential from any mobile device requesting to join the ECN. AP 120 then may use the PAN credential to determine whether each mobile device attempting to join the ECN is authorized to do so. For example, in one such embodiment, AP 120 may use a shared key to authenticate each mobile device attempting to join the ECN, using any one of many known session key generation techniques with each subsequent mobile device joining the ECN. For example, in one embodiment of the present invention, AP 120 may use the key generation and management methods included in the Alternate MAC/PHY specification included in Bluetooth version 3.0. In another such embodiment, the PAN credential may be data that PAN relay device 103 may send to AP 120 that the AP can use to authenticate other devices in the PAN. For example, PAN relay device 103 may send, to AP 120, the X.500 Distinguished Name of each of the other mobile devices in the PAN, or the PAN relay device may send a certificate serial number of each of the other mobile devices in the PAN, or the PAN relay device may send an identifying attribute from a credential that other roaming mobile devices used to authenticate themselves to the PAN relay device. By way of another example, PAN relay device 103 may send AP 120 an entire credential used by the other mobile devices in the PAN when they authenticated with the PAN relay device. For example, PAN relay device 103 may authenticate three other PAN mobile devices with a certificate associated with each mobile device and then may send AP 120 the three certificates or attributes from the three certificates.

In still other embodiments of the present invention, before the ECN is established, PAN relay device 103 may have to prove to AP 120 that the PAN relay device is authorized to request the establishment of the ECN. That is, PAN relay device 103 may have to authenticate (422) itself with AP 120 by some scheme other than sending the predetermined key to the AP. For example, PAN relay device 103 may authenticate itself via a certificate-based authentication protocol, such as using IPsec (Internet Protocol Security) or TLS (Transport Layer Security), or the PAN relay device may provide the AP with a signed assertion that the AP can validate. AP 120 would validate the signature on such an assertion through standard public key crypto-graphical means. For example, if a signed assertion is used to authenticate the PAN relay device, AP 120 may acquire a certificate for the creator of the assertion and validate the certificate (again, using standard public key crypto-graphical means) and then retrieve the public key from that certificate to validate the signature on the assertion. If a certificate is used to authenticate the PAN relay device, the certificate would identify the PAN relay device and include an attribute that indicates that PAN relay device 103 is allowed to create an ECN for a given organization (such as a specific public safety agency). The certificate also may indicate a maximum number of mobile devices that can join PAN 130 or the types of nodes that can join the PAN. As used herein, 'type' may indicate any one or more of (1) whether the mobile device is a phone, radio, tablet, personal computer, and so on, (2) whether the mobile device is owned by an agency or by the user, (3) a security level of the mobile device, or (4) a group/squadron/precinct to which the mobile device is assigned. The AP may determine the "type" of device requesting to join the ECN by forcing each device to perform either certificate based or assertion based authentication with the AP. It is well known and understood that performing authentication with the AP also refers to performing authentication with an agent of the AP, such as is common with the standard EAP, RADUIS, and DIAMATER protocols.

In response to receiving the request to establish the ECN, and subsequent to authenticating PAN relay device 103 if authentication is required, AP 120 establishes (424) the second network service, that is, the ECN. In one embodiment of the present invention, in establishing the ECN, AP 120 simply may add PAN relay device 103 to the ECN after authenticating the PAN relay device, without the need for the PAN relay device to re-associate. In another embodiment of the present invention, PAN relay device 103 may disconnect from its association with AP 120 based on the first SSID, and re-associate with the AP using the ECN identifier as the SSID.

Further, in response to receiving the request to establish the ECN, AP 120 begins advertising (426), for example, in Beacon frames, the ECN identifier. For example, the AP advertises beacons with an SSID that has the same value as the ECN identifier, or a value based on the ECN identifier. In one embodiment the AP does not advertise beacons with an SSID based on the ECN identifier, but instead responds to standard WLAN Probe Request messages that include the ECN identifier or an SSID based on the ECN identifier. The advertising of the ECN identifier serves to inform that the AP 120 supports the ECN. The ECN identifier, for example, may include a first data field identifying itself as an ECN identifier and may further comprise all or part of an identifier of PAN relay device 103, for example, a Media Access Control (MAC) address of the mobile device in the PAN (that is, [SSID="ECN":"<BT MAC>"]). By way of another example, the ECN identifier further may include all or part of the identifier of the associated LAN or AP, that is, the SSID of LAN 140. All mobile devices joining the ECN then will be bridged by AP 120, for example, at the MAC layer (Layer 2) such as is traditional for an AP. In the case where the extended collaborative network is implemented with WLAN, a device joins the ECN by joining a WLAN with an SSID based on the EDN identifier.

When roaming non-relay PAN device 102 detects (428) the advertisement (that is, the beacon), the non-relay PAN device determines that it recognizes the ECN identifier included in the advertisement. For example, non-relay PAN device 102 may compare the ECN identifier included in the advertisement to an ECN identifier maintained in the non-relay PAN device's as least one memory device 204 and determine that the ECN identifiers match. In response to recognizing the ECN identifier, non-relay PAN device 102 joins (430) the ECN, for example, by conveying an association request to AP 120 that includes the ECN identifier. In response to receiving the ECN identifier, AP 120 associates with non-relay PAN device 102. Non-relay PAN device 102 then establishes a wireless link 124 with the AP as part of the ECN. As part of the joining of the ECN, non-relay PAN device 102 further may authenticate (432) with AP 120 using the PAN credential associated with the ECN, for example, the shared key maintained by the non-relay PAN device and that is conveyed to the AP by PAN relay device 103.

At this point, AP 120 bridges (434) all traffic between PAN relay device 103 and non-relay PAN device 102 on the ECN, that is, over LAN wireless links 122 and 124. AP 120 treats the ECN as a separate LAN network from other networks supported by the AP, such as LAN 140. In turn, PAN relay device 103 exchanges PAN communications with non-relay PAN mobile device 102 via LAN wireless links 122 and 124, thus creating a virtual collaborative link 116 with non-relay PAN device 102 and a virtual extension of PAN 130, that is to say, PAN 130 is extended via the ECN. Thus, a hybrid collaborative network is established, wherein collaborative devices 103 and 104 directly collaborate via PAN 130, and collaborative devices 102 and 103 collaborate via AP 120, creating a virtual extension of PAN 130, that is, the ECN. Signal flow diagram 400 then ends.

In another embodiment of the present invention, AP 120 may continue to broadcast both the SSID for LAN 140 and the ECN identifier for the ECN in separate beacons, even after joining non-relay PAN device 102 to the ECN. In one such embodiment, the AP may advertise the ECN identifier only for a limited time, after which it will continue bridging traffic for the ECN but only re-advertise the ECN identifier if instructed to do so by the PAN relay device 103.

Figure 5:
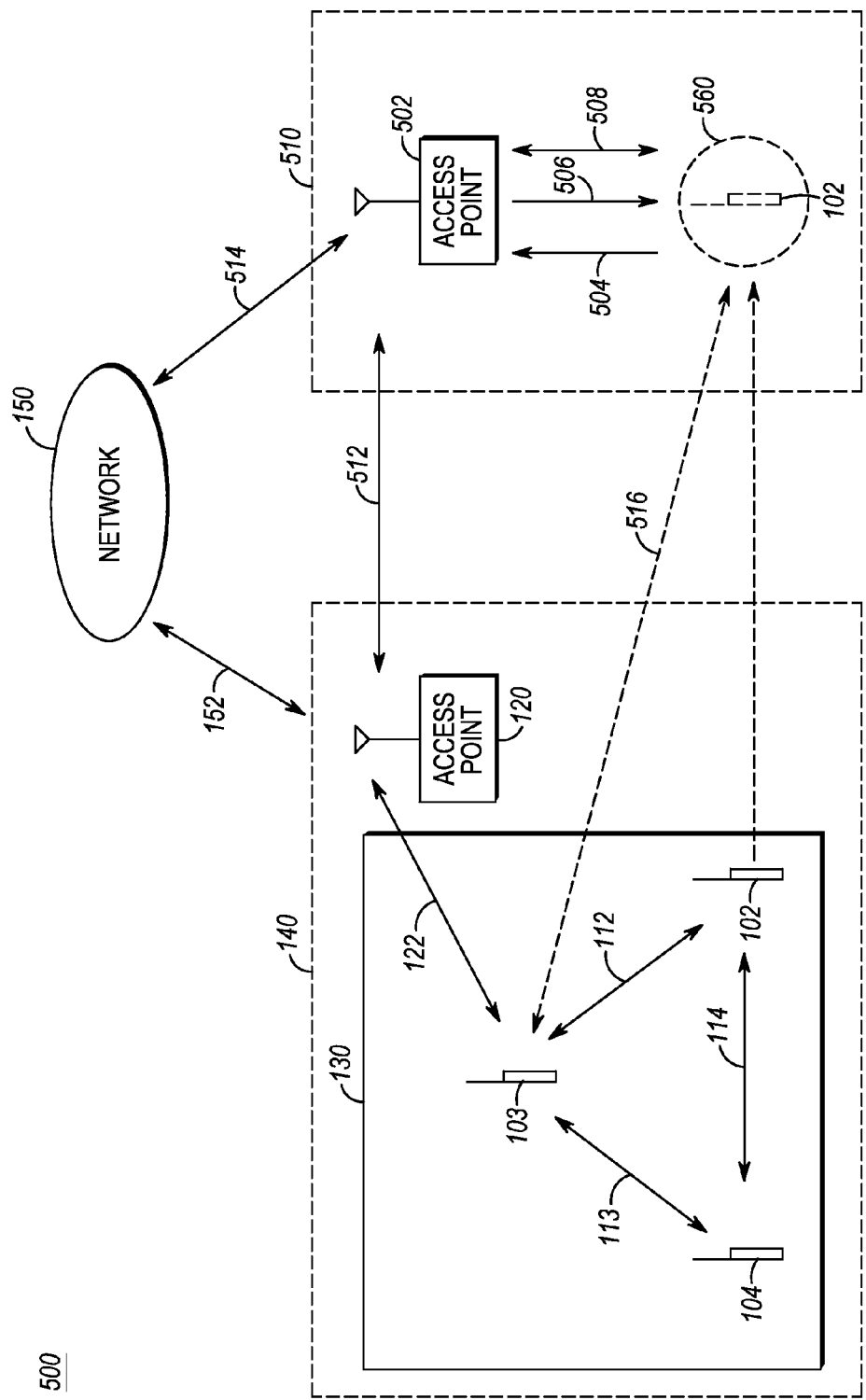
FIG. 5 is a block diagram of a wireless communication system in accordance with some embodiments of the present invention.
Figure 6A:
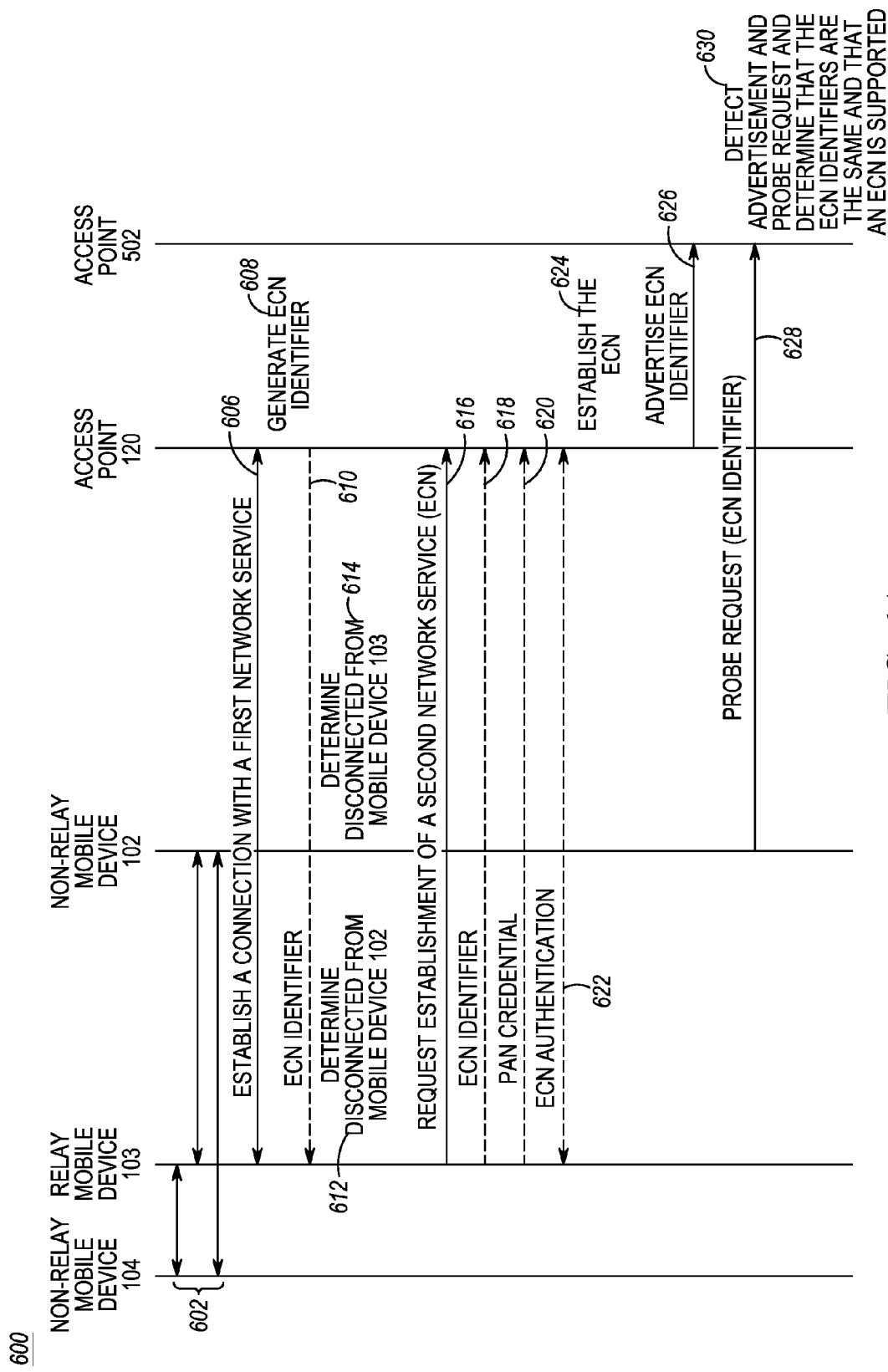
FIG. 6A is a signal flow diagram illustrating a method by which the communication system of FIG. 5 establishes a virtual PAN in accordance with some embodiments of the present invention.
Figure 6B:
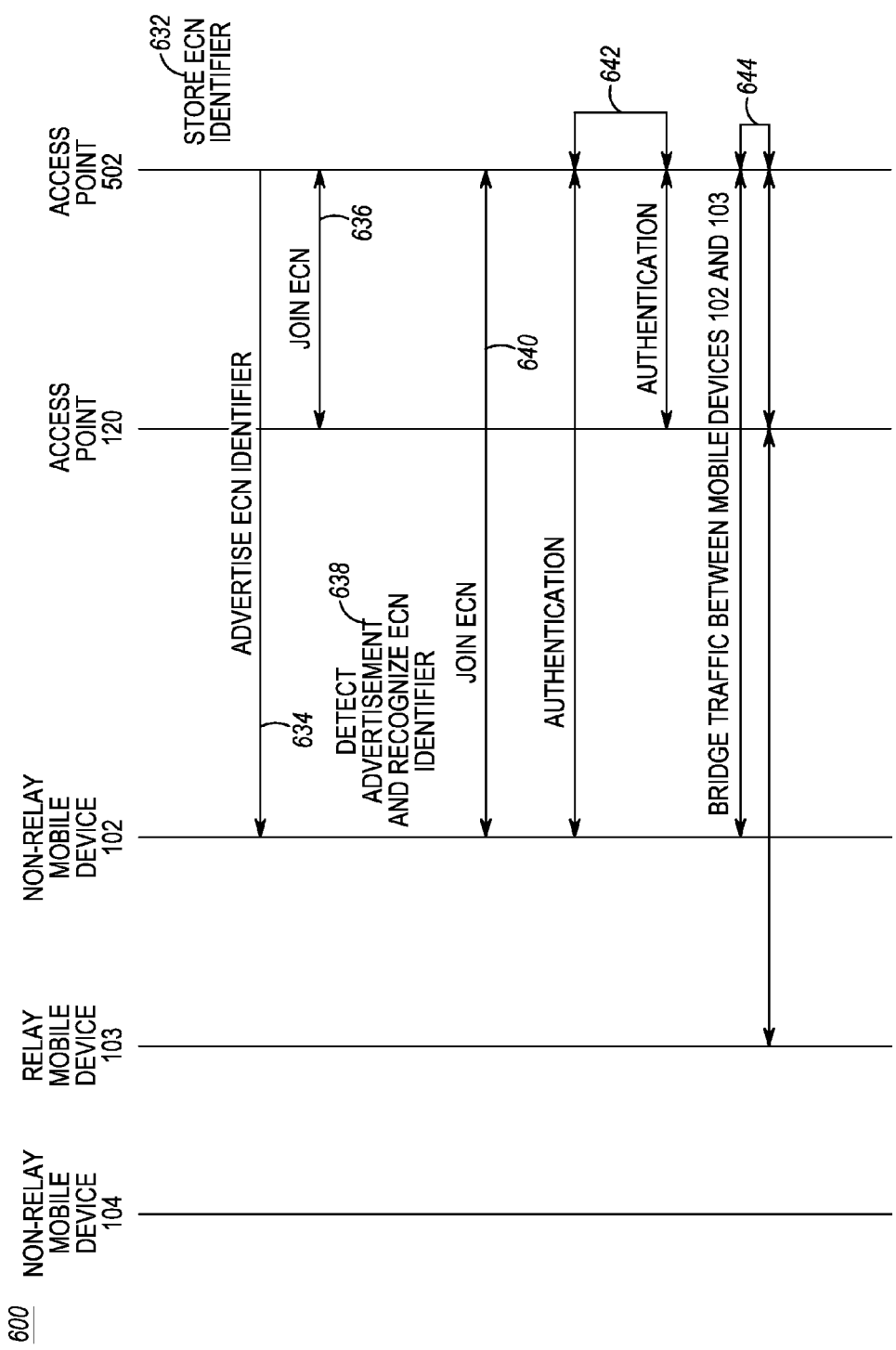
FIG. 6B is a continuation of the signal flow diagram of FIG. 6A illustrating a method by which the communication system of FIG. 5 establishes a virtual PAN in accordance with some embodiments of the present invention.

Turning now to FIGS. 5, 6A, and 6B, another embodiment of the present invention is described wherein non-relay PAN device 102 may roam sufficiently far away from PAN relay device 103 that it is no longer in range of LAN 140 and AP 120. However, in such an embodiment, non-relay PAN device 102 may be within range of another AP such that the non-relay PAN device may create a virtual collaborative link with PAN relay device 103, and a virtual extension of PAN 130, via both APs.

That is, and referring now to FIG. 5, a block diagram is provided of a wireless communication system 500 in accordance with some embodiments of the present invention wherein a PAN is virtually extended via multiple APs. Similar to wireless communication system 100, wireless communication system 500 comprises multiple mobile devices 102-104 that communicate directly with each other, that is, engage in a peer-t o-peer wireless communication with each other, over PAN 130. For example, mobile device 102 communicates with mobile device 103 via wireless link 112, mobile device 102 communicates with mobile device 104 via wireless link 114, and mobile device 103 communicates with mobile device 104 via wireless link 113, wherein each of wireless links 112-114 is a short range wireless link, such as Bluetooth. Mobile devices 102-104, which communicate with each other and are under the control of a single user, again may be referred to herein as collaborating devices, and the wireless links over which the collaborating devices communicate may be herein referred to as collaborative links. In addition, one of mobile devices 102-104, such as mobile device 103, may be designated as a PAN relay device, and the other mobile devices, that is, mobile devices 102 and 104, then are non-relay PAN devices.

Communication system 100 further includes a first access point (AP) 120 that services each mobile device, such as mobile devices 102-104, residing in a coverage area of the AP via a first network service, that is, a local area network (LAN) 140, served by the AP over a bi-directional local area network link 122, such as Wi-Fi. Further, AP 120 communicates with infrastructure devices of a wide area narrowband or broadband network (WAN) 150 serving the AP via a corresponding narrowband or broadband WAN link 152. However, unlike communication system 100, communication system 500 further includes a second AP 502 that services each mobile device residing in a coverage area of the AP via a third network service, that is, a local area network (LAN) 510. AP 502 further communicates with infrastructure devices of a WAN, such as WAN 150, serving the AP via an air interface 514, and communicates with AP 120 via an interface 512, which may be a wireline or a wireless interface. In other embodiments of the present invention, AP 502 may communicate directly with AP 120, may communicate with AP 120 via WAN 150, and/or AP 502 may be served by a WAN (not shown) different from the WAN serving AP 120 and AP 502 may communicate with AP 120 via the two intervening WANs.

Referring now to FIGS. 6A and 6B, a signal flow diagram 600 is provided that illustrates a method executed by communication system 500 to establish a virtual PAN in accordance with some embodiments of the present invention. Similar to signal flow diagram 400, signal flow diagram 600 begins when mobile devices 102-104 are initially paired up (602) in PAN 130 via their first network interfaces 206 and short range wireless links 112-114. Thus, mobile devices 102-104 may be considered to be collaborating devices and wireless links 112-114 are collaborative links. The collaborating devices 102-104 include a PAN relay device, for example, a first mobile device 103, and one or more non-relay PAN devices, such as a second mobile device 102 and a third mobile device 104.

Further, PAN relay device 103 establishes (606), via second network interface 208 of the PAN relay device, a connection to AP 120 via the first network service, that is, LAN 140, and air interface 122. For example, PAN relay device 103 may authenticate with LAN 140, and in particular AP 120, via a certificate based-authentication protocol as known in the art. As described above, normally AP 120 will only be offering, that is, broadcasting, an identifier of LAN 140, that is, an SSID associated with the LAN. In response to receiving the SSID, PAN relay device 103 uses this SSID to connect to, that is, associate with, AP 120. PAN relay device 103 may establish this connection with AP 120 either before or after determining that a non-relay PAN device, such as mobile device 102, has disconnected from the PAN relay device, as described below.

Subsequent to pairing up with non-relay PAN devices 102 and 104, PAN relay device 103 realizes (612) that a non-relay PAN device, such as mobile device 102, is no longer connected to the PAN relay device. At around the same time, non-relay PAN device 102 also realizes (614) that the non-relay PAN device is no longer connected to PAN relay device 103. For example, the disconnection can be a result of a normal event, such as non-relay PAN device 102 powering down. However, the disconnection instead can be a result of non-relay PAN device 102 roaming out of range of PAN 130 (depicted as position 560 in FIG. 5). Communication system 100 then provides for bridging the PAN together even though a slave device has roamed outside of the PAN.

In response to determining that non-relay PAN device 102 is no longer connected to PAN relay device 103, the PAN relay device requests (616) that AP 120 establish a second network service, that is, an extended collaborative network (ECN), which second network service/ECN is identified by an ECN identifier, that is, a credential to be used by other mobile devices who wish to join the second network service, that is, the ECN.

In one embodiment of the present invention, PAN relay device 103 may convey (618) the ECN identifier to AP 120 in response to establishing the connection with the AP for the first network service. In another embodiment of the present invention, PAN relay device 103 may convey (618) the ECN identifier to AP 120 in response to requesting the establishment of the second network service, that is, the ECN. For example, when mobile devices 102, 103, and 104 initially are paired up in PAN 130, PAN relay device 103 may generate an ECN identifier and distribute it to collaborative devices 102 and 104, which collaborative devices then store the ECN identifier in their respective at least one memory device 204. When PAN relay device 103 then requests that AP 120 establish the ECN, the PAN relay device 103 may convey the ECN identifier to the AP, and the AP then stores the ECN identifier in its at least one memory device 304.

In still other embodiments of the present invention, AP 120 may generate (608) the ECN identifier and provide (610) the ECN identifier to PAN relay device 103. That is, when the PAN relay device 103 connects to AP 120, the AP may generate the ECN identifier and store the ECN identifier in the AP's at least one memory device 304. AP 102 then may convey the ECN identifier to PAN relay device 103, and the PAN relay device may distribute the ECN identifier to collaborative devices 102 and 104. Each of collaborative devices 102-104 then stores the ECN identifier in their respective at least one memory device 204.

Optionally, PAN relay device 103 further may convey (620) to AP 120, after establishing a connection to the AP for the first network service, that is, LAN 140, a PAN credential, such as a predetermined key maintained by the mobile device and that is shared among all of the collaborating mobile devices, that is, mobile devices 102-104, such as a pre-shared key (PSK) or an attribute, for example, from an authentication certificate, that is shared among all of the collaborating mobile devices and that must appear in any credential from any mobile device requesting to join the ECN. AP 120 then may use the PAN credential, that is, the shared key or attribute, to determine whether each mobile device attempting to join the ECN is authorized to do so. That is, AP 120 may use the shared key to authenticate each mobile device attempting to join the ECN, using any one of many known session key generation techniques with each subsequent mobile device joining the ECN. For example, in one embodiment of the present invention, AP 120 may use the key generation and management methods included in the Alternate MAC/PHY specification included in Bluetooth version 3.0.

In still other embodiments of the present invention, before the ECN is established, PAN relay device 103 may have to prove to AP 120 that the PAN relay device is authorized to request the establishment of the ECN. That is, PAN relay device 103 may have to authenticate (622) itself with AP 120 by some scheme other than sending the predetermined key to the AP. For example, PAN relay device 103 may authenticate itself via a certificate-based authentication protocol, such as using IPsec (Internet Protocol Security) or TLS (Transport Layer Security), or the PAN relay device may provide the AP with a signed assertion that the AP can validate. AP 120 would validate the signature on such an assertion through standard public key crypto-graphical means, as described in greater detail with respect to FIG. 4. The certificate used in this process would include an attribute that indicates that PAN relay device 103 is allowed to create an ECN for a given organization (such as a specific public safety agency). The certificate also may indicate a maximum number of mobile devices that can join PAN 130 or the types of nodes that can join the PAN.

In response to receiving the request to establish the second network service, that is, the ECN, and subsequent to authenticating PAN relay device 103 if authentication is required, AP 120 establishes (624) the ECN. In one embodiment of the present invention, in establishing the ECN, AP 120 simply may add PAN relay device 103 to the ECN after authenticating the PAN relay device, without the need for the PAN relay device to re-associate. In another embodiment of the present invention, PAN relay device 103 may disconnect from its association with AP 120 via the SSID, and re-associate with the AP using the ECN identifier.

Further, in response to receiving the request to establish the ECN, AP 120 begins advertising (626), for example, in Beacon frames, the ECN identifier. The advertising of the ECN identifier serves to inform that the AP 120 supports the ECN. The ECN identifier, for example, may include a first data field identifying itself as an ECN identifier and may further comprise all or part of an identifier of PAN relay device 103, for example, a Media Access Control (MAC) address of the mobile device in the PAN (that is, [SSID="ECN":"<BT MAC>"]). By way of another example, the ECN identifier further may include all or part of the identifier of the associated LAN or AP, that is, the SSID of LAN 140. All mobile devices joining the ECN then will be bridged at the MAC layer (Layer 2), such as is traditional for an AP.

In response to determining, by non-relay PAN device 102, that it is no longer connected to PAN relay device 103, non-relay PAN device 102 begins transmitting (628), for example, in a Probe Request 504, the ECN identifier. When second AP 502 receives (630) the advertisement from first AP 120, which advertisement includes the ECN identifier, and further receives the transmission from non-relay PAN device 102, which transmission also includes the ECN identifier, second AP 502 determines whether the ECN identifiers match and further determines whether it, that is, AP 502, supports the second network service, that is, the ECN. In response to determining that it supports the ECN, second AP 502 stores (632) the ECN identifier in the at least one memory device 304 of the AP and advertises (634), for example, in a Probe Response or in Beacon frames 506, the ECN identifier. The advertising of the ECN identifier serves to inform roaming non-relay PAN device 102 that second AP 502 supports the second network service, that is, the ECN. Further, second AP 502 joins (636) the second network service, that is, connects to the first AP 120, as a client, that is, as if it were another non-relay PAN device, and establishes a media link, if one is not already established, with first AP 120.

When roaming non-relay PAN device 102 detects (638) the advertisement (that is, the beacon) broadcast by AP 502 and that includes the ECN identifier, the non-relay PAN device determines that it recognizes the ECN identifier included in the advertisement. For example, mobile device 102 may compare the detected ECN identifier to an ECN identifier maintained in its as least one memory device 204 and determine that the ECN identifiers match. In response to recognizing the ECN identifier, non-relay PAN device 102 joins (640) the second network service, that is, the ECN. That is, non-relay PAN device 102 associates with AP 502 using the ECN identifier and establishes a wireless link 508 with second AP 502. As part of the joining of the ECN, non-relay PAN device 102 further may authenticate (642) with first AP 120 via second AP 502 using the PAN credential associated with the ECN, for example, the shared key maintained by the mobile device and conveyed to first AP 120 by PAN relay device 103.

At this point, AP 502 and AP 120 jointly bridge (644) all traffic between PAN relay device 103 and non-relay PAN device 102 via the ECN, that is, AP 502 and AP 120 bridge all traffic between PAN relay device 103 and non-relay PAN device 102 via LAN wireless links 122 and 508, APs 120 and 502, and link 512, thus creating a virtual collaborative link 516 between the PAN relay device and the non-relay PAN device via a virtual extension of PAN 130, that is, wherein PAN 130 is extended via LANs 140 and 510. Signal flow diagram 600 then ends.

Figure 7:
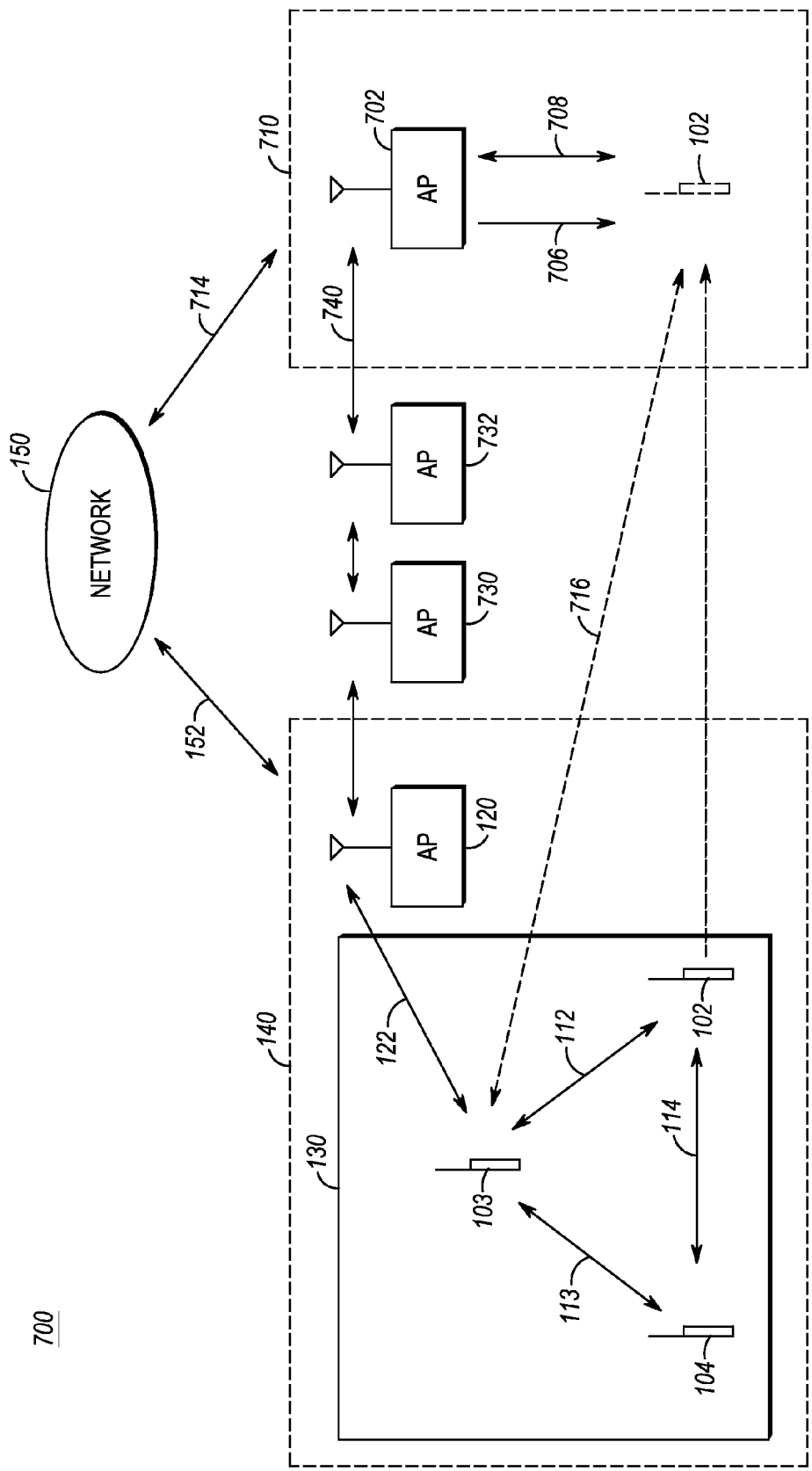
FIG. 7 is a block diagram of a wireless communication system in accordance with some embodiments of the present invention.

Turning now to FIG. 7, a block diagram is provided of a wireless communication system 700 in accordance with some embodiments of the present invention, wherein a PAN is virtually extended via multiple APs. Similar to wireless communication system 100 and 500, wireless communication system 700 comprises multiple mobile devices 102-104 that communicate directly with each other, that is, engage in a peer-to-peer wireless communication with each other, over PAN 130. For example, mobile device 102 communicates with mobile device 103 via wireless link 112, mobile device 102 communicates with mobile device 104 via wireless link 114, and mobile device 103 communicates with mobile device 104 via wireless link 113, wherein each of wireless links 112-114 is a short range wireless link, such as Bluetooth. Mobile devices 102-104, which communicate with each other and are under the control of a single user, again may be referred to herein as collaborating devices, and the wireless links over which the collaborating devices communicate may be herein referred to as collaborative links. In addition, one of mobile devices 102-104, such as mobile device 103, may be designated as a PAN relay device, and the other mobile devices, that is, mobile devices 102 and 104, then are non-relay PAN devices.

Communication system 700 further includes an access point (AP) 120 that services each mobile device, such as mobile devices 102-104, residing in a coverage area of the AP via a first network service, that is, a local area network (LAN) 140, served by the AP over a bi-directional local area network link 122, such as Wi-Fi. Further, AP 120 communicates with infrastructure devices of a wide area narrowband or broadband network (WAN) 150 serving the AP via a corresponding narrowband or broadband WAN link 152. Further, similar to communication system 500, communication system 700 includes a second AP 702 that services each mobile device residing in a coverage area of the AP via a third network service, that is, a local area network (LAN) 710. AP 702 further communicates with infrastructure devices of a WAN, such as WAN 150, serving the AP via an air interface 714, and communicates with AP 120 via one or more intermediate APs, such as a third AP 730 and a fourth AP 732 (two shown).

Figure 8A:
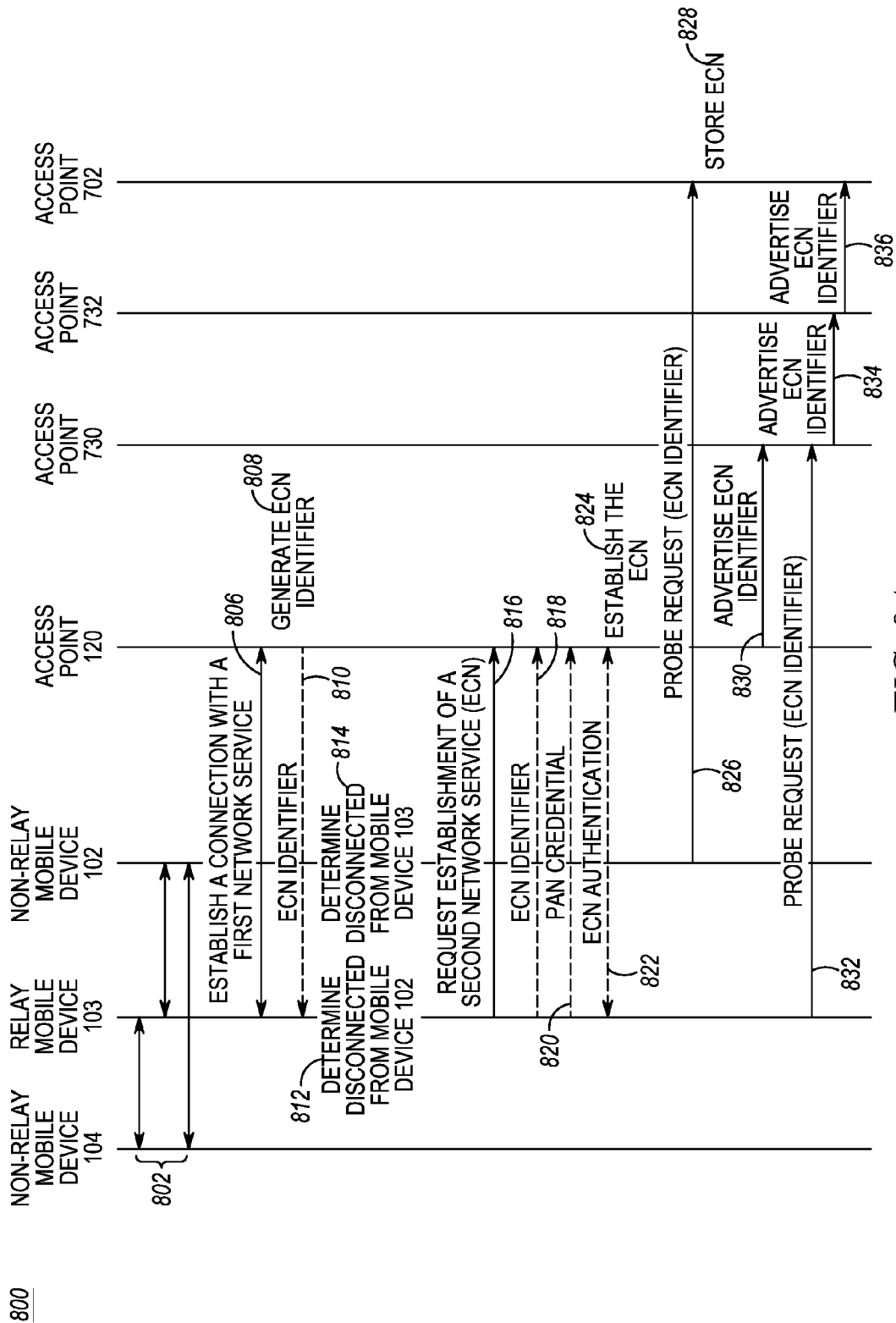
FIG. 8A is a signal flow diagram illustrating a method by which the communication system of FIG. 7 establishes a virtual PAN in accordance with some embodiments of the present invention.
Figure 8B:
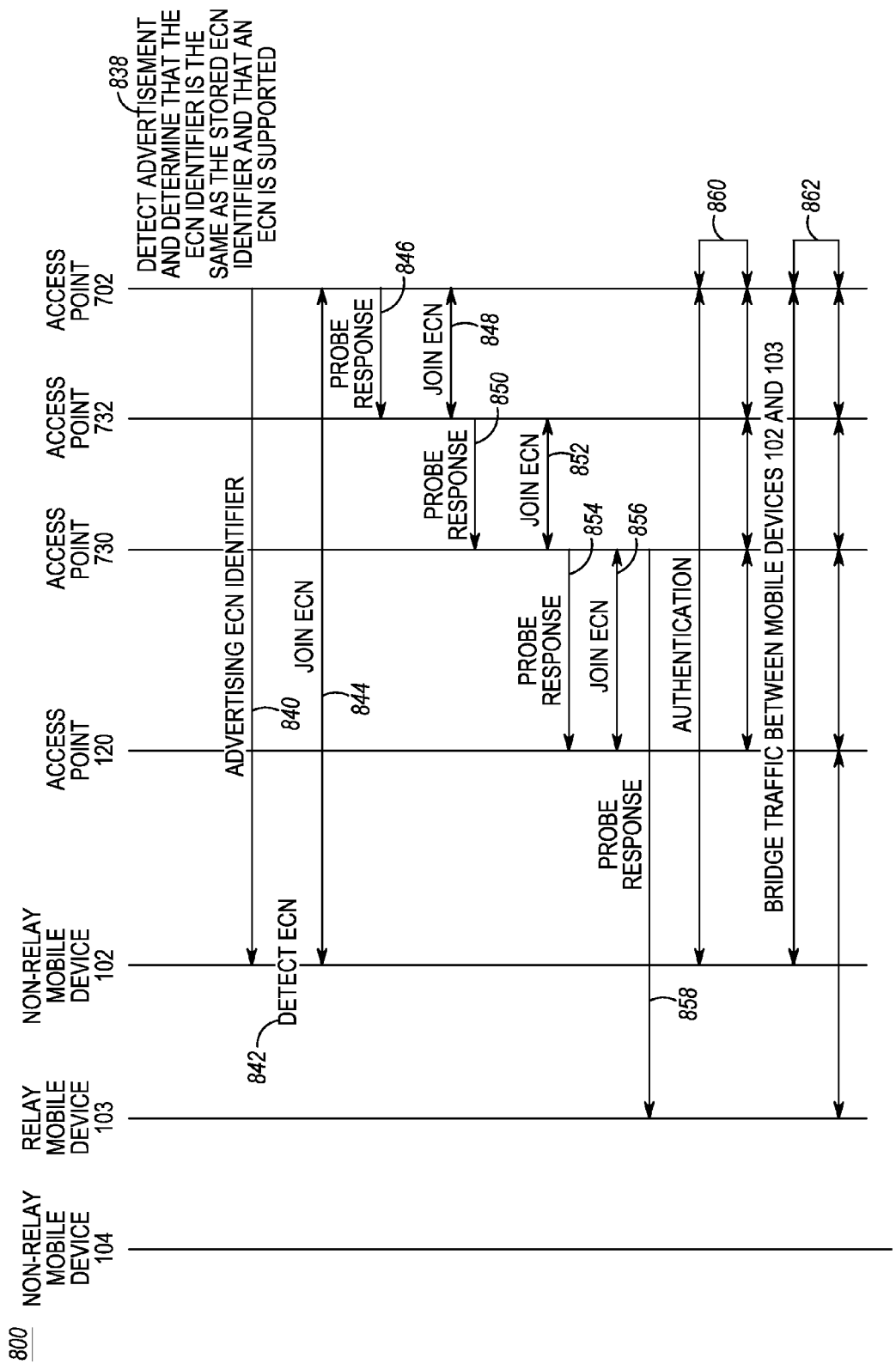
FIG. 8B is a continuation of the signal flow diagram of FIG. 8A illustrating a method by which the communication system of FIG. 7 establishes a virtual PAN in accordance with some embodiments of the present invention.

Referring now to FIGS. 8A and 8B, a signal flow diagram 800 is provided that illustrates a method executed by communication system 700 to establish a virtual PAN in accordance with some embodiments of the present invention. Similar to signal flow diagrams 400 and 600, signal flow diagram 800 begins when mobile devices 102-104 are initially paired up (802) in PAN 130 via their first network interfaces 206 and short range wireless links 112-114. Thus, mobile devices 102-104 may be considered to be collaborating devices and wireless links 112-114 are collaborative links. The collaborating devices 102-104 include a PAN relay device, for example, a first mobile device 103, and one or more non-relay PAN devices, such as a second mobile device 102 and a third mobile device 104.

Further, similar to signal flow diagrams 400 and 600, PAN relay device 103 establishes (806) a connection to AP 120 via the first network service, that is, LAN 140, and air interface 122. Subsequent to pairing up with non-relay PAN devices 102 and 104, PAN relay device 103 realizes (812) that a non-relay PAN device, such as mobile device 102, is no longer connected to the PAN relay device. At around the same time, non-relay PAN device 102 also realizes (814) that the non-relay PAN device is no longer connected to PAN relay device 103. In response to determining that non-relay PAN device 102 is no longer connected to PAN relay device 103, the PAN relay device requests (816) that AP 120 establish a second network service, that is, an extended collaborative network (ECN), which second network service/ECN is identified by an ECN identifier, that is, a credential to be used by other mobile devices who wish to join the second network service, that is, the ECN.

In various embodiments of the present invention, PAN relay device 103 may convey (818) the ECN identifier to AP 120 in response to establishing the connection with the AP for the first network service or in response to requesting the establishment of the second network service, that is, the ECN. For example, when mobile devices 102, 103, and 104 initially are paired up in PAN 130, PAN relay device 103 may generate an ECN identifier and distribute it to collaborative devices 102 and 104, which collaborative devices then store the ECN identifier in their respective at least one memory device 204. When PAN relay device 103 then requests that AP 120 establish the ECN, the PAN relay device 103 may convey the ECN identifier to the AP, and the AP then stores the ECN identifier in its at least one memory device 304. In still other embodiments of the present invention, AP 120 may generate (808) the ECN identifier and provide (810) the ECN identifier to PAN relay device 103, and the PAN relay device may distribute the ECN identifier to collaborative devices 102 and 104. Each of collaborative devices 102-104 then stores the ECN identifier in their respective at least one memory device 204.

Optionally, PAN relay device 103 may convey (820) to AP 120, after establishing a connection to the AP for the first network service, that is, LAN 140, a PAN credential, for example, a predetermined key such as a pre-shared key (PSK), maintained by the mobile device and that is shared among all of the collaborating mobile devices, that is, mobile devices 102-104, or an attribute, for example, from an authentication certificate, that is shared among all of the collaborating mobile devices and that must appear in any credential from any mobile device requesting to join the ECN. AP 120 then may use the PAN credential to determine whether each mobile device attempting to join the ECN is authorized to do so. In still other embodiments of the present invention, before the ECN is established, PAN relay device 103 may prove to AP 120 that the PAN relay device is authorized to request the establishment of the ECN. That is, PAN relay device 103 may authenticate (822) itself with AP 120 by some scheme other than sending the predetermined key to the AP, as described in greater detail with respect to FIG. 4.

In response to receiving the request to establish the second network service, that is, the ECN, and subsequent to authenticating PAN relay device 103 if authentication is required, AP 120 establishes (824) the ECN. In one embodiment of the present invention, in establishing the ECN, AP 120 simply may add PAN relay device 103 to the ECN after authenticating the PAN relay device, without the need for the PAN relay device to re-associate. In another embodiment of the present invention, PAN relay device 103 may disconnect from its association with AP 120 via the SSID, and re-associate with the AP using the ECN identifier.

In response to determining, by non-relay PAN device 102, that it is no longer connected to PAN relay device 103, non-relay PAN device 102 transmits (826), for example, in a Probe Request, the ECN identifier, which Probe Request is received by, and which ECN identifier is stored (828) by, an AP serving the non-relay PAN device, that is, AP 702. Further, in response to receiving the request to establish the ECN, AP 120 begins advertising (830), for example, in Beacon frames, the ECN identifier. The advertising of the ECN identifier serves to inform that the AP 120 supports the ECN.

When an intermediate AP, such as third AP 730, receives advertisements, for example, beacons, from AP 120, AP 730 may initially ignore the advertisements, as AP 730 does not recognize the ECN identifier. However, in response to also receiving (832), from PAN relay device 103, a Probe Request that includes the ECN identifier, AP 730 begins advertising (834), that is, transmitting, for example, in Beacon frames, the ECN identifier. Similarly, when fourth AP 732 receives the Probe Request from AP 730, AP 732 also determines that it does not recognize the ECN identifier and AP 732 also begins advertising (836), that is, transmitting, for example, in Beacon frames, the ECN identifier. Thus, Probe Requests that include the ECN identifier are propagated through communication system 700.

When the AP serving the roaming non-relay PAN device 102, that is, AP 702, detects (838) the Probe Request transmitted by intermediate AP 732 and that includes the ECN identifier, the AP 702 determines whether the ECN identifier in the Probe Request from AP 732 matches the ECN identifier stored by the AP, that is, AP 702. AP 702 further determines whether it supports the second network service, that is, the ECN. In response to determining that the ECNs match and further determining that it supports the ECN, AP 702 advertises (840), for example, in a Probe Response or in Beacon frames, the ECN identifier. The advertising of the ECN identifier serves to inform roaming non-relay PAN device 102 that second AP 702 supports the second network service, that is, the ECN.

When roaming non-relay PAN device 102 detects (842) the advertisement (for example, the Probe Response or beacon, broadcast by AP 702 and that includes the ECN identifier, the non-relay PAN device determines whether it recognizes the ECN identifier included in the advertisement and, if so, joins (844) the second network service, that is, the ECN. That is, non-relay PAN device 102 associates with AP 702 using the ECN identifier and establishes a wireless link 708 with second AP 702.

Further, when AP 702 detects the advertisement, for example, a Probe Request, from intermediate AP 732 that includes an ECN identifier that matches an ECN identifier maintained by AP 702, AP 702 transmits (846), to AP 732, an acknowledgment of the advertisement, for example, a Probe Response, that includes the ECN, thereby joining the ECN. In response to receiving the Probe Response from AP 702, AP 732 connects (848) to AP 702 and transmits (850) a Probe Response to AP 730 that includes the ECN, thereby also joining the ECN. In response to receiving the Probe Response from AP 732, AP 730 connects (852) to AP 732 and transmits (854), to AP 120, an acknowledgment of the advertisement received from AP 120, for example, a Probe Response, that includes the ECN, thereby also joining the ECN. In turn, in response to receiving the Probe Response from AP 730, AP 120 connects (856) to AP 730, thus creating a chain of APs (120, 730, 732, 702) that serve to connect PAN relay device 103 to non-relay PAN device 102. Further, in response to receiving the Probe Response from AP 730 and having received the Probe Request from PAN relay device 103, AP 730 also transmits (858) a Probe Response to the PAN relay device.

As part of the joining of the ECN, non-relay PAN device 102 further may authenticate (860) with first AP 120 via second AP 702 and intermediate APs 730 and 732 using the PAN credential, for example, the shared key, maintained by the mobile device and conveyed to first AP 120 by PAN relay device 103. In such an embodiment, AP 120 then may inform AP 702 whether the authentication is successful. However, in another embodiment, as part of connecting to AP 702 via the intermediate APs 730, 732, AP 120 further may convey the PAN credential, such as the shared key, to AP 702 via the intermediate APs and AP 702 may authenticate non-relay PAN device 102 using the PAN credential.

At this point, and assuming that any authentication performed is successful, AP 702 and AP 120 jointly bridge (862) all traffic between PAN relay device 103 and non-relay PAN device 102 via the ECN, that is, AP 702 and AP 120 bridge all traffic between PAN relay device 103 and non-relay PAN device 102 via LAN wireless links 122 and 708, APs 120, 730, 732, and 702, and link 512, thus creating a virtual collaborative link 716 between the PAN relay device and the non-relay PAN device via a virtual extension of PAN 130, that is, wherein PAN 130 is extended via LANs 140 and 510, and intermediate APs 730 and 732. Signal flow diagram 800 then ends.

In still other embodiments of the present invention, a number of AP hops for each of the beacons and the probe messages that are acceptable for construction of an ECN may be limited. In such an embodiment, when the number of hops for a beacon exceeds a beacon hop threshold, or a number of hops for a probe message exceeds a probe message hop threshold (in other words, when a number of intermediate APs and/or end-to-end APs that are connected to form the ECN exceeds a threshold), then communication system 100 will be prohibited from forming the ECN, that is, bridging the PAN.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for bridging a Personal Area Network (PAN) with a local area network (LAN), the system comprising:
   an access point comprising:
   a processor;
   an at least one memory device that is configured to store a set of instructions that, when executed by the processor, cause the processor to;
   receive, from a first mobile device, a request to authenticate with the access point for a first network service;
   receive, from the first mobile device, a request to establish a second network service, wherein the second network service provides for bridging the PAN with the LAN;
   determine that the first mobile device is authorized to make such a request and establish such a network;
   determine a credential to be used by mobile devices who wish to join the second network service;
   establish the second network service;
   receive, from a second mobile device, a request to join the second network service and an associated credential;
   join the second mobile device to the second network service; and
   in response to joining the second mobile device to the second network service, bridge traffic between the first mobile device and the second mobile device using the second network service;
   wherein determining that the first mobile device is authorized to make such a request comprises authenticating the first mobile device;
   wherein determining the credential comprises:
   receiving the credential from the first mobile device in the request to establish the second network service; or
   generating the credential and conveying the credential to the first mobile device;
   wherein the credential comprises a routing address of a collaboration manager server.

2. The system of claim 1, wherein the set of instructions further comprises instructions that, when executed by the processor, cause the processor to:

determine that the first mobile device is authorized to request the provisioning of the second network service.

3. The system of claim 1, wherein joining the second mobile device to the second network service comprises:
authenticating the second mobile device.

4. The system of claim 1, wherein the set of instructions further comprises instructions that, when executed by the processor, cause the processor to:
advertise the second network service, wherein the advertisement comprises an enhanced collaborative network (ECN) identifier; and
in response to advertising the second network service, receive, from a second mobile device, a request to join the second network service.

5. The system of claim 4, wherein the access point is a first access point (AP), wherein the system further comprises a second AP, wherein establishing the second network service comprises establishing, by the first AP, the second network service, wherein advertising the second network service comprises advertising, by the first AP, the second network service, wherein the set of instructions further comprises instructions that, when executed by the processor, cause the processor to:
receive, from the second mobile device, a request to join the second network service;
in response to advertising the second network service, receive, by the first access point from the second access point, a request to join the second network service; and
in response to receiving the request to join the second network service from the second access point, join the second access point to the second network service;
wherein the second access point is configured to:
advertise the second network service;
receive, from the second mobile device, a request to join the second network service; and
join the second mobile device to the second network service;
wherein the first access point and the second access point are configured to jointly bridge traffic between the first mobile device and the second mobile device using the second network service.

* * * * *